No. 746,475. PATENTED DEC. 8, 1903.
W. DUCKETT.
LAWN MOWER.
APPLICATION FILED JAN. 24, 1903.
NO MODEL.
Fig. 1.
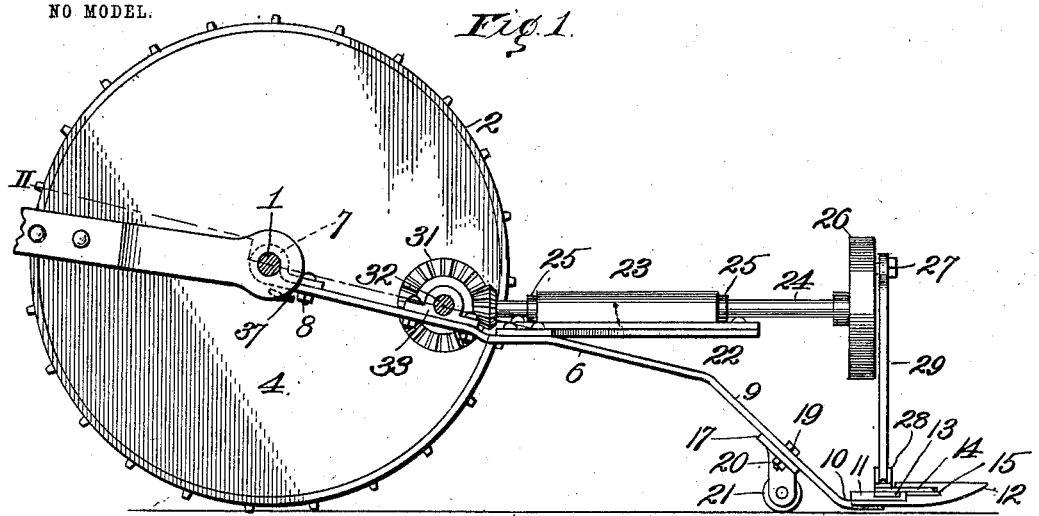
Fig. 2.
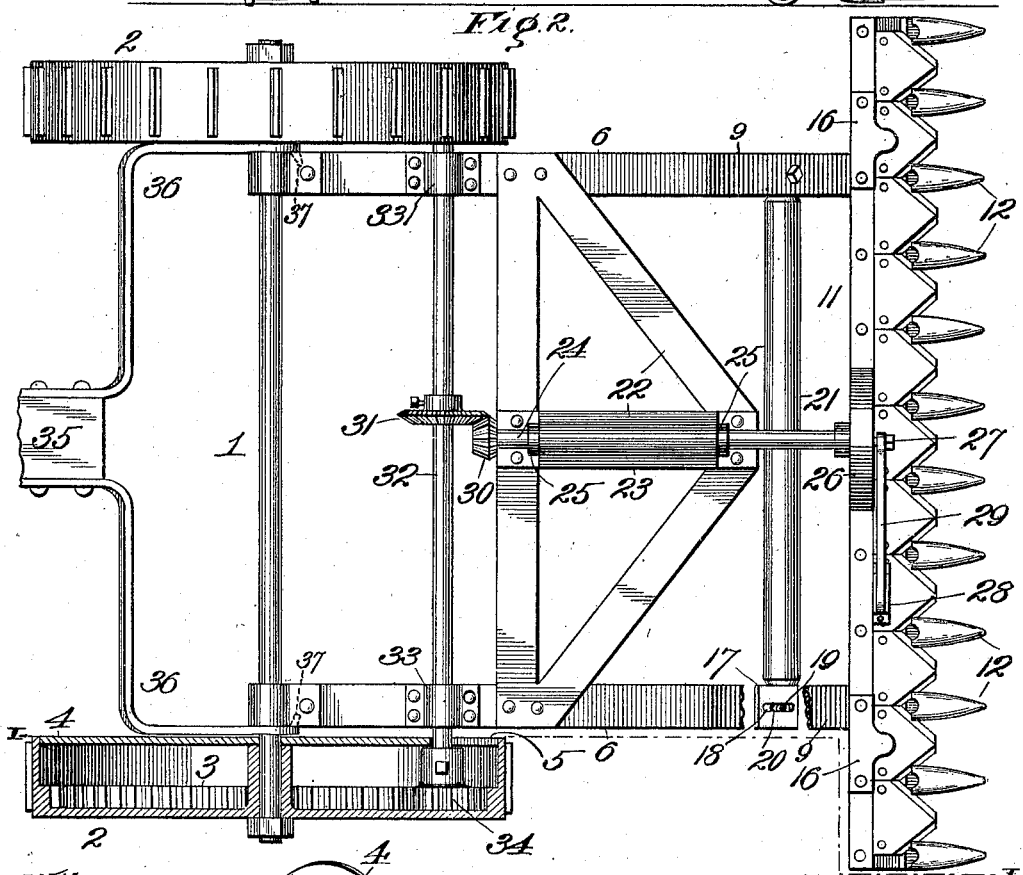
Fig. 3.
Witnesses:
A. McArthur
Mrs. H. McCarthy
Inventor:
Wm. Duckett.
By George H. Thorpe
Atty.

No. 746,475. Patented December 8, 1903.

UNITED STATES PATENT OFFICE.

WILLIAM DUCKETT, OF LANSING, KANSAS.

LAWN-MOWER.

SPECIFICATION forming part of Letters Patent No. 746,475, dated December 8, 1903.

Application filed January 24, 1903. Serial No. 140,333. (No model.)

*To all whom it may concern:*

Be it known that I, WILLIAM DUCKETT, a citizen of the United States, residing at Lansing, in the county of Leavenworth and State of Kansas, have invented certain new and useful Improvements in Lawn-Mowers, of which the following is a specification.

This invention relates to lawn-mowers, and more especially to that class embodying a reciprocatory cutter-bar in lieu of the customary rotary cutting mechanism, and has for its object to produce a simple, strong, durable, and efficiently-operating and reliable machine of this character which is adjustable to mow grass at varying distances from the earth.

To this end the invention consists in certain novel and peculiar features of construction and organization, as hereinafter described and claimed, and in order that it may be fully understood reference is to be had to the accompanying drawings, in which—

Figure 1 is a vertical section taken in line I I of Fig. 2. Fig. 2 is a view showing the entire machine in top plan view, except one of the wheels, which is shown in section on the dotted line I I of Fig. 1. Fig. 3 is a perspective view of one of the notched plates on a reduced scale.

Referring to the drawings in detail, 1 designates the shaft or axle, and 2 the drive-wheels journaled thereon and peripherally roughened in the customary manner and closed at their outer sides. Said wheels are formed with internal gear-teeth 3, and removable plates 4, through which the shaft or axle loosely extends, are fitted loosely in the wheels and serve to effectually exclude grass therefrom. Said plates are provided with radial slots or notches 5 for a purpose which hereinafter appears.

A skeleton frame consists of a pair of preferably parallel bars 6, arranged between the wheels and having their rear ends bent around the axle and pivotally embracing the same, as at 7, the ends of the bars being rigidly held to their body portions by bolt-and-nut connections, as at 8. The bars 6 are pitched downwardly at a slight angle for a suitable distance, as shown in Fig. 1, and then more abruptly, as at 9, and terminate at their lower ends in short horizontal ends 10, disposed in close proximity to the ground.

11 designates a transverse bar bolted or otherwise suitably secured upon ends 10 of the skeleton frame and of length to project a few inches (full size) beyond the outer sides of the wheels, and projecting forwardly from said bar are guard-fingers 12 of customary type.

13 is a cutter-bar fitting and adapted to reciprocate in a groove in bar 11 and equipped with the customary sickle-sections 14, which coöperate with the plates 15 and the guard-fingers, the sickle-bar being held down to its work by means of retaining-lugs 16, secured to bar 11.

For the purpose of supporting the front end of the skeleton frame at the desired point and therefore disposing the cutting mechanism to cut the grass at the desired length a pair of plates 17 underlie and fit snugly against the inclined portions 9 of said frame and are provided with longitudinal slots 18 for engagement by the bolts 19, the threaded ends of said bolts being engaged by clamping-nuts 20 for the purpose of securing the plates at the desired height. The plates are provided with vertically-depending lugs forming journal-bearings for the ends of the roller 21.

22 designates a frame secured rigidly to the skeleton frame and forming a support for the elongated bearing 23 of longitudinal shaft 24, endwise movement of such shaft being prevented by means of collars 25 thereon at opposite ends of said bearing. Rigidly secured on the front end of the shaft is a disk 26, provided with a wrist-pin 27, pivotally connected to a bracket 28 of the cutter-bar by a link 29. On the rear end of the shaft is a small beveled gear 30, meshing with a larger beveled gear 31, secured rigidly on transverse shaft 32. Said shaft is journaled in the bearings 33, secured to the skeleton frame, and extends through slots 5, hereinbefore referred to, and carries at its ends small gear-wheels 34, meshing with the internal teeth 3 of the drive-wheels. The provision of slots or notches 5 in the outer edges of plates 4 permits the shaft 32, previously equipped with wheels 34, to be disposed in operative relation with said plates before it is secured in bearings 33 and before the wheels 2 are secured on shaft 1. The parts can therefore be assembled more conveniently and perhaps more quickly than where it is necessary to properly adjust and secure wheels 34 on shaft 32 after the side plates are slipped on the latter, as would be necessary if said slots or notches did not open through the margins of said plates.

35 designates the customary handle-bar, and 36 the angle-arms branching from said bar and pivotally embracing the axle between the skeleton frame and the wheels, said arms having inwardly-projecting lugs 37 underlying bars 6, so that they will catch under said bars and prevent the handle end (not shown) of bar 35 from dropping to the ground when released.

The operation of the machine is obvious, the revolution of the drive-wheels as the machine is pushed forward transmitting motion to the cutter-bar through the medium of the gearing described.

This machine has demonstrated its practicability as a mower of grass of any length, and by reason of its cutting mechanism projecting laterally beyond the wheels it is possible to cut the grass closer to the edge of a walk and the side of a house than is possible with the ordinary rotary cutter.

When it is desired to convey the machine inoperatively to a certain point, the operator simply grasps the skeleton frame and swings it upwardly and rearwardly until wheel 31 or bearings 33 rest upon bar 35 or angle-arms 36, respectively, this disposition of the parts being possible for the reason that the rotation of the frame upon the axle is accompanied by like movement on the part of the plates 4, which plates while being thus adjusted are in operation, because the gear-wheels 34 are completely turned several times while rolling from the position in front of the axle to a position almost diametrically opposite.

From the above description it will be apparent that I have produced a lawn-mower embodying all of the advantages enumerated as desirable in the statement of invention, and while the illustration and description are of my preferred type of structure it will be understood that the invention is susceptible of modification as regards its form, proportion, detail construction, and arrangement without departing from its essential spirit and scope or sacrificing any of its advantages.

Having thus described the invention, what I claim as new, and desire to secure by Letters Patent, is—

1. A lawn-mower, comprising drive-wheels having internal teeth, an axle therefor, circular plates fitting snugly in and forming the inner sides of said wheels and fitting loosely on the axle and provided with radial notches, a frame pivoted on the axle and provided at its front end with a cutting mechanism and a supporting-roller, a transverse shaft suitably journaled and carried by said frame and projecting through said notches, gear-wheels on said shaft and engaging the teeth of the drive-wheels, and means for transmitting motion from said shaft to the cutting mechanism.

2. A lawn-mower, comprising drive-wheels having internal teeth, an axle therefor, circular plates fitting snugly in and forming the inner sides of said wheels and fitting loosely on the axle and provided with radial notches, a frame pivoted on the axle and provided at its front end with a cutting mechanism and a supporting-roller, a transverse shaft suitably journaled and carried by said frame and projecting through said notches, gear-wheels on said shaft and engaging the teeth of the drive-wheels, a handle-bar and angle-arms secured thereto and pivoted on the axle and provided with inwardly-projecting lugs underlying said frame.

In testimony whereof I affix my signature in the presence of two witnesses.

WM. DUCKETT.

Witnesses:
CHARLES ERNST,
E. D. SEAMAN.